United States Patent [19]

Ando

[11] Patent Number: 5,449,982
[45] Date of Patent: Sep. 12, 1995

[54] TOP/BOTTOM PINCUSHION CORRECTION CIRCUIT

[75] Inventor: Hiroshi Ando, Ibaraki, Japan

[73] Assignee: Matsushita Electric Industrial Co., Ltd., Kadoma, Japan

[21] Appl. No.: 118,696

[22] Filed: Sep. 10, 1993

Related U.S. Application Data

[63] Continuation of Ser. No. 974,420, Nov. 12, 1992, abandoned.

[30] Foreign Application Priority Data

Mar. 17, 1992 [JP] Japan ................... 4-059946

[51] Int. Cl.⁶ ............................................. H01J 29/56
[52] U.S. Cl. ................................................... 315/371
[58] Field of Search .......................................... 315/371

[56] References Cited

U.S. PATENT DOCUMENTS

| | | |
|---|---|---|
| 4,395,662 | 7/1983 | Sexton, Jr. . |
| 4,501,996 | 2/1985 | Yamaguchi ................ 315/371 |
| 4,518,898 | 5/1985 | Tarnowski et al. ........... 315/371 |
| 4,642,531 | 2/1987 | Jobling et al. .............. 315/371 |
| 4,692,804 | 9/1987 | Aoki et al. . |
| 4,795,946 | 1/1989 | Nishiyama . |
| 4,927,219 | 5/1990 | Golik . |

FOREIGN PATENT DOCUMENTS 2119030 5/1990 Japan .

*Primary Examiner*—Theodore M. Blum
*Attorney, Agent, or Firm*—Cushman, Darby & Cushman

[57] ABSTRACT

A pincushion correction circuit has a pair of units having a first and a second differential comparator circuit for sampling the upper portion and lower portion of a vertical sawtooth wave signal, respectively, a first and a second multiplier circuit for squaring outputs of the first and second differential comparator circuits, and a first and a second amplitude adjusting circuit, besides a conventional voltage/current converter, a multiplier and an amplifier circuit. The outputs of the two amplitude adjusting circuits are summed by an adder and supplied to the amplifier circuit; whereby top and bottom pincushion distortions are individually adjustable.

6 Claims, 6 Drawing Sheets

5,449,982

TOP/BOTTOM PINCUSHION CORRECTION CIRCUIT

This is a continuation of application Ser. No. 07/974,420, filed on Nov. 12, 1992, which was abandoned upon the filing hereof.

FIELD OF THE INVENTION AND RELATED ART STATEMENT

1. Field of the Invention

The present invention generally relates to an improvement in the deflection circuit for the cathode ray tube (CRT) display device of a television receiver (TV) or a video monitor of a computer system. More particularly, it is concerned with an improved top/bottom pincushion correction circuit in the horizontal deflection distortion of such CRT device.

2. Description of the Prior Art

The corner pincushion correction of a display device becomes more and more important as a larger deflection angle and a higher flatness of the faceplate become widely used in modern CRTs for wide angle television receivers and video display monitors of computers.

FIG. 4 is a block diagram showing an example of the prior art horizontal pincushion distortion correction circuit. In this circuit, a sawtooth wave signal 21 having a vertical period (hereinafter, referred to as "vertical sawtooth wave"), which is produced by the charge/discharge of a capacitor of an external circuit and timed by a vertical synchronization signal of the a video image signal, is input to a voltage/current converter 22. The voltage/current converter 22 produces a sawtooth current signal by utilizing a control signal given thereto through its input terminal 23. A distribution ratio of the current signal produced by the voltage/current converter 22 is adjusted by a control data signal, supplied from a digital-to-analog converter (DAC) 23a controlled by a microprocessor (not shown) or the like in a related unit external to the apparatus, through the input terminal 23. Thereby, the phase of a pincushion distortion correction quadratic curve wave (hereinafter, to be referred to as "parabolic wave") is changed.

A first multiplier circuit 24 squares or multiplies by itself the vertical sawtooth wave signal from the voltage/current converter 22; and then it generates a parabolic wave signal for correcting the pincushion distortion in the raster display. The first multiplier circuit 24 receives a data signal for adjusting the amplitude of the parabolic wave signal through a first control voltage input terminal 25 and DAC 252.

A second multiplier circuit 26 squares or multiplies by itself the parabolic wave signal from the first multiplier circuit 24 and generates a quartic signal or a 4th degree curve signal (created by a squared parabola) for correcting the horizontal pin cushion distortions at the top and bottom parts of the left and right parts of the raster. The second multiplier circuit 26 receives a data signal for adjusting the amplitude of the quartic wave signal through a second control voltage input terminal 27 DAC 27A.

An adder circuit 28 is connected to receive output signals from the first multiplier 24 and second multiplier 26, and performs an addition of the parabolic wave signal from the first multiplier circuit 24 for pincushion-distortion correction, and the quartic curve wave signal from the second multiplier 26 for correcting the horizontal distortions at top and bottom of the left/right parts of the raster. By the addition, the adder circuit 28 generates an output representing the sum of the addition.

An amplifier circuit 29 amplifies the output supplied by the adder circuit 28 which is the sum of said parabolic wave signal for correcting the pincushion distortion and of said quartic curve wave signal for correcting the corner distortions in the raster, and produces a corresponding output signal 30.

The control data signal for adjusting the distribution ratio of the current signal output of the voltage/current converter 22 is supplied from a 23a DAC controlled by a microprocessor or the like external device through the terminal 23. The control data signal for adjusting the amplitudes of the parabolic wave signal is supplied to the multiplier 24 from DAC 25a and outside through the terminal 25. The control data signal for adjusting the quartic curve wave signal is supplied to the latter from the outside DAC 27a and through the control voltage input terminal 27.

FIG. 5(a) through 5(d) are waveform charts showing electrical waveforms at respective points in the above-configured conventional circuit. FIG. 5(a) represents the vertical sawtooth wave signal at the input terminal 21, FIG. 5(b) represents the parabolic wave signal at the output terminal of the first multiplier 24, FIG. 5(c) represents the quartic curve wave signal at the output terminal of the second multiplier circuit 26, and FIG. 5(d) represents the sum of the addition of the parabolic wave signal FIG. 5(b) and the quartic curve wave signal FIG. 5(c). The sum signal as composed in one set of the circuits is used for correcting the horizontal corner distortion of top part of the raster and the bottom part of the raster.

According to the above-mentioned conventional pincushion correction circuit, both the top parts and bottom parts of the horizontal pincushion distortion of the raster are intended to be corrected by using the common correction signal obtained by the above-mentioned single circuit. Therefore, individual distortion correction for the top part and the bottom part have not been possible.

Throughout this specification and claims, the term "top corners" is used to denote the right/left corners in the top part of the raster display on the cathode ray tube, and the term "bottom corners" is used to denote the east/west corners in the bottom part of the same. The east/west corners are corrected of horizontal pincushion distortions by applying the composite curve signal of FIG. 5(d) to a known diode modulator circuit. And the right and left end parts of the curve of FIG. 5(d) at the vicinities which are designated by the two vertical dotted lines correspond to the right and left parts of the raster.

If the raster display at the top corners is always distorted to the exact same degree as that at the bottom corners, there is no problem using the same correction signal of FIG. 5(d) for both the top corners and the bottom corners. However, the distortion in the top corners is by no means the same as that in the bottom corners possibly due to the configuration asymmetry in the actually employed cathode ray tubes and in the deflection yoke.

Therefore, the prior art pincushion correction circuit has a problem that even if the distortion in the top corners is corrected sufficiently, the bottom corners are insufficiently corrected or over-corrected. Or in some cases when the distortion in the bottom corner is corrected accurately, the top corner is excessively corrected.

OBJECT AND SUMMARY OF THE INVENTION

It is an object of the present invention to overcome the above-mentioned disadvantages, and to perform a more perfect correction of all distortion in a raster display, by providing an independent correction of the distortions in the top corners and bottom corners.

Another object of the present invention is to provide a cathode ray tube (CRT) display device for a television receiver or a video monitor of a computer that has a minimum of pincushion distortion in the raster display on the CRT.

According to the present invention, there is provided a top/bottom individually adjustable pincushion correction circuit for correcting the pincushion distortion in the top corners of the raster display on a cathode ray and the bottom corners of the raster display separately from each other, which correction circuit comprises:

a pair of unit circuits consisting of a first unit and a second unit, the first unit comprising:
- a first differential comparator circuit which is supplied with a saw-tooth wave voltage signal having a vertical scanning frequency for sampling an upper portion of the sawtooth wave signal which corresponds to the bottom corners of the raster display,
- a first multiplier which multiples an output signal of the first differential comparator circuit by itself to make a square thereof,
- a first amplitude adjusting circuit which adjusts the amplitude of an output signal of the first multiplier, in accordance with a first control data signal applied to the first amplitude adjusting circuit, the second unit comprising:
- a second differential comparator circuit which is supplied with a saw-tooth wave voltage signal having a vertical scanning frequency for sampling a lower portion of the sawtooth wave signal which corresponds to the top corners of the raster display,
- a second multiplier which multiplies an output signal of the second differential comparator circuit by itself to make a square thereof,
- a second amplitude adjusting circuit which adjusts the amplitude of an output signal of the second multiplier, in accordance with a second control data signal applied to the second amplitude adjusting circuit,
- an adder circuit which performs an addition of the amplitude-adjusted output signals of the first amplitude adjusting circuit and the second amplitude adjusting circuit, to thereby produce a sum signal thereof,
- a voltage/current converter which is supplied with the sawtooth wave voltage signal and converts the sawtooth wave voltage signal into a current signal, in accordance with a control data signal,
- a third multiplier circuit which receives the voltage/current converted current signal of the voltage/current converter and squares it to produce an east/west-pincushion distortion-correction quadratic curve (parabolic) signal, in accordance with a control data signal given thereto, and an amplifier circuit which receives the east/west-pincushion distortion-correction quadratic curve (parabolic) signal produced by the third multiplier circuit and the corner distortion correction signal supplied by the adder circuit.

The present invention realizes a correction of the deflection distortions of a raster display more accurately than that conventionally known by performing correction to the top corners of the raster display on the cathode ray tube independently from that to the bottom corners.

By providing a pair of independent control systems each having a pincushion distortion correcting function for the top corners or the bottom corners of the raster display, a better correction of pincushion distortion correction is possible, and its practical advantage is great.

While the novel features of the present invention are set forth particularly in the appended claims, the invention, both as to organization and contents, will be better understood and appreciated, along with other objects and features thereof, from the following detailed description taken in conjunction with the drawings.

BRIEF DESCRIPTION OF THE DRAWINGS

FIG. 2(a) and 2(b) show an example of the circuitry corresponding to the block diagram of FIG. 1 encircled by a broken line, wherein FIG. 2(a) represents a bottom corner distortion correction circuit and FIG. 2(b) represents a top corner distortion correction circuit.

DESCRIPTION OF THE PREFERRED EMBODIMENTS

Figure 1:
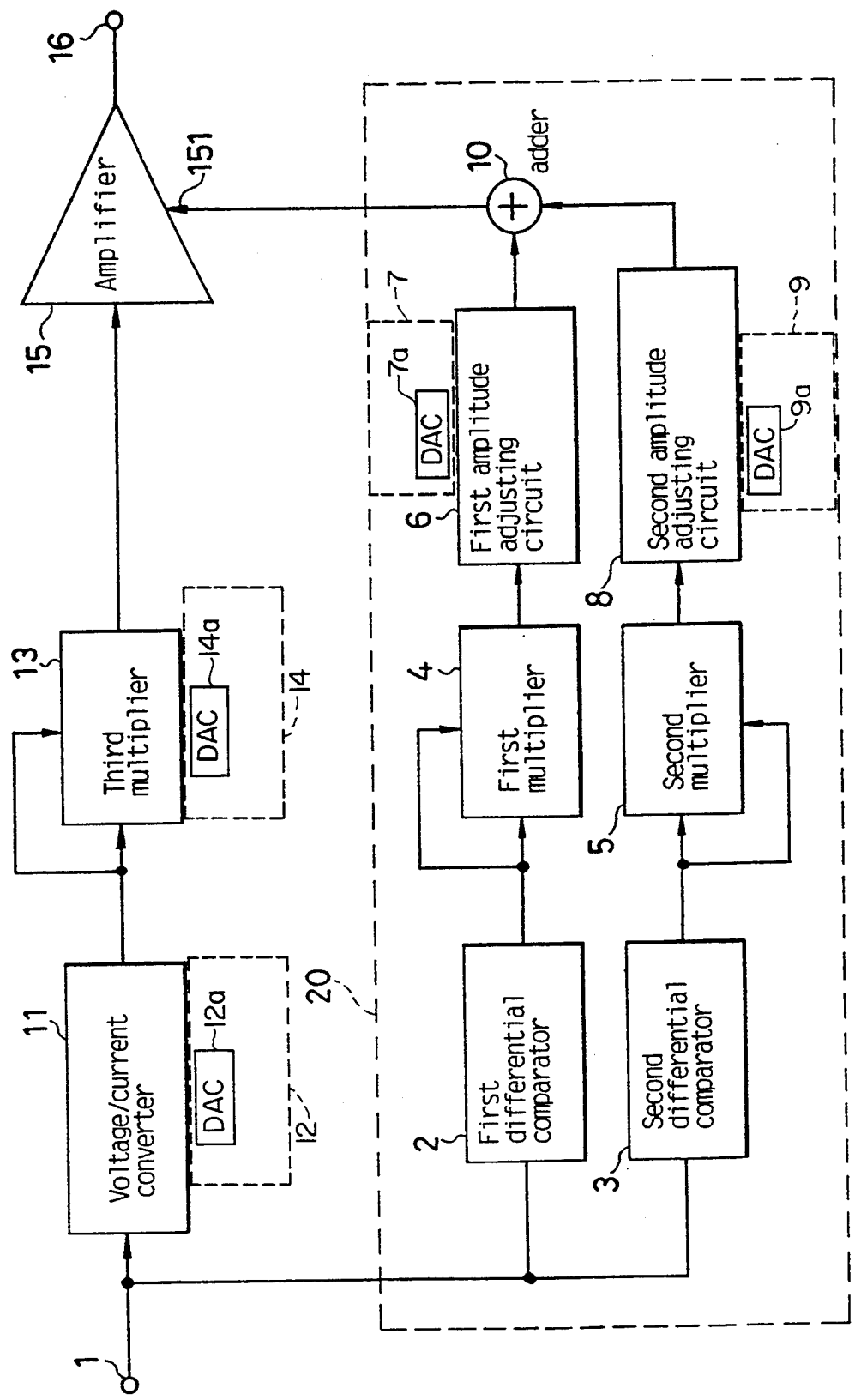
FIG. 1 is a block diagram showing an embodiment of the pincushion correction circuit built in accordance with the present invention.

FIG. 1 is a block diagram showing a preferred embodiment of the pincushion distortion correction circuit, wherein the block 20 surrounded by a broken line is a newly entered part for this corner pincushion correction circuit. In FIG. 1, an input vertical sawtooth wave signal 1 is produced by the charge/discharge of a known (not shown) capacitor-type time determining circuit which 1s synchronized to a vertical synchronization signal contained in a video image signal. The input vertical sawtooth wave signal is supplied to the input terminals of a voltage/current converter 11, a first differential comparator 2, and a second differential comparator 3, all in common. The first differential comparator 2 samples the upper portion of the vertical sawtooth wave signal which corresponds to the bottom corners of raster when the sawtooth wave signal is used for vertical deflection and produces a sampled signal representing the bottom corners of raster. The second differential comparator 3 samples the lower portion of the vertical sawtooth wave signal which corresponds to the top corners of raster when the signal is used in correction for the vertical deflection and produces a sampled signal representing the top corners of raster.

A fist multiplier 4 multiplies the sampled signal produced by the first differential comparator 2 by itself (i.e. squares) it, and outputs a first quadratic curve or parabolic wave signal. A second multiplier 5 multiplies the sampled signal produced by the second differential comparator 3 by itself (i.e. squares) it, and outputs a second parabolic wave signal.

A first amplitude adjusting circuit 6 has a control voltage signal input terminal 7 and adjusts and DAC 7a the amplitude of the first parabolic wave signal supplied from the first multiplier 4. A second amplitude adjusting circuit 8 has a control voltage signal input terminal 9 DAC 9a and adjusts the amplitude of the second parabolic wave signal supplied from the second multiplier 5.

An adder circuit 10 performs an addition of the bottom corner correction wave signal supplied by the first amplitude adjusting circuit 6 with the top corner correction wave signal supplied by the second amplitude adjusting circuit 8, and issues a composite corner-distortion-correction wave signal.

The voltage/current converter 11 has a control voltage signal input terminal 12 and DAC 12a and converts the vertical sawtooth wave voltage signal into a corresponding current signal. A control data signal is applied to the input terminal 12 by a microprocessor which controls the DAC 12a for varying the distribution ratio output from the voltage/current converter 11, thereby to change the phase in a pincushion-distortion-correction parabolic-wave signal. It is supplied from a known microprocessor or the like external to the unit.

A third multiplier 13 has a control voltage signal input terminal 14 DAC 14A and multiplies the vertical sawtooth current signal by itself (i.e. squares) it and thus produces the pincushion-distortion-correction parabolic-wave signal. A data signal for adjusting the amplitude of the parabolic-wave signal to be produced in the multiplier circuit 13 is supplied to the control voltage signal input terminal 14 and DAC 14a from the external microprocessor or the like.

An amplifier circuit 15 receives the pincushion-distortion-correction parabolic wave signal produced by the third multiplier circuit 13 and the corner-distortion-correction wave signal issued from the adder circuit 10, and produces a pincushion-distortion-correction parabolic-wave signal modified by the corner-distortion correction signal. Respective control voltage signal input terminals 7, 9, 12 and 14 and DACs 7a, 9a, 12a and 14a are supplied with data signals from the external microprocessor or the like.

Figure 3:
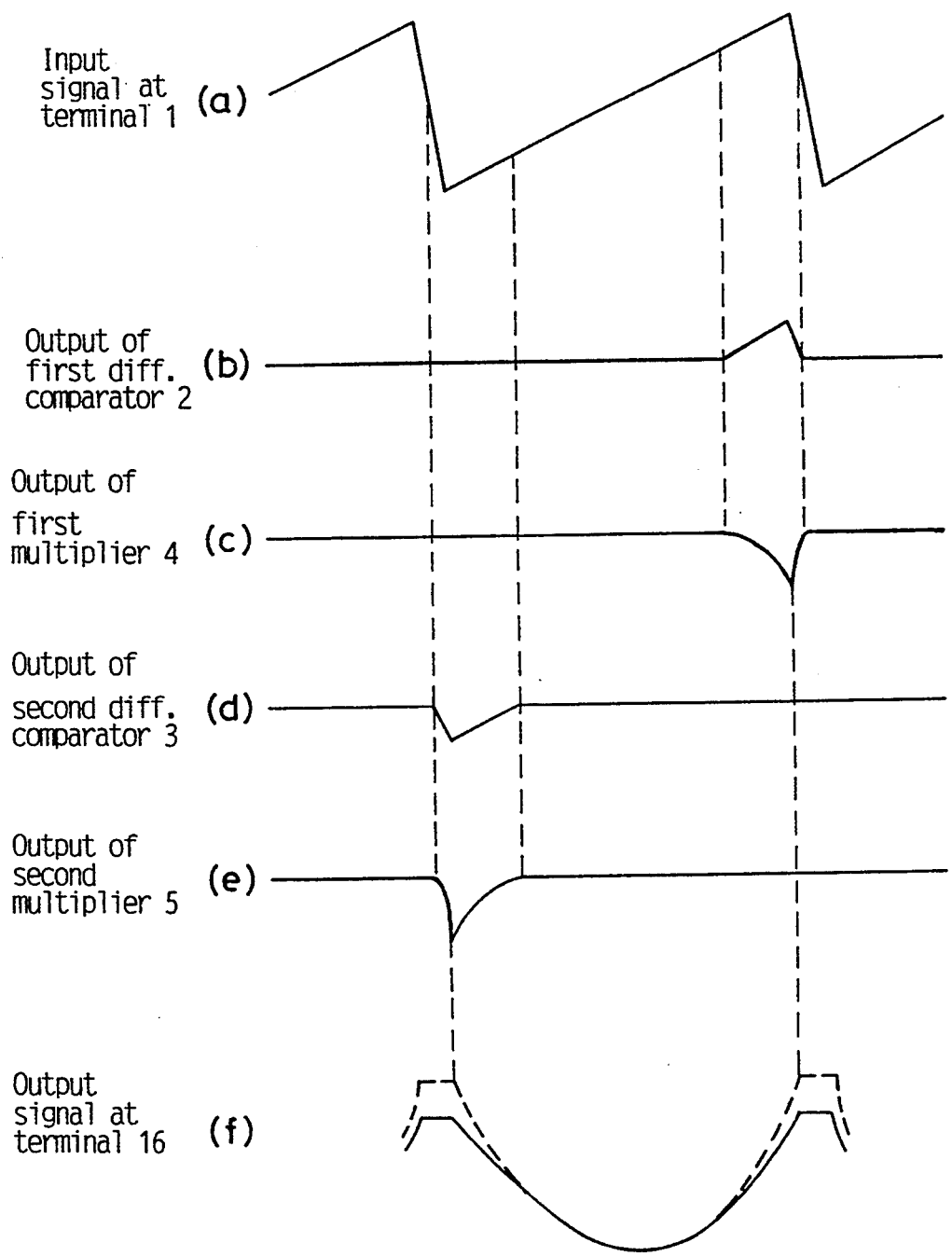
FIG. 3(a) through 3(f) are a set of waveform charts showing a concept of the independent generation of the top/bottom corner distortion correction signals in the embodiment shown in FIG. 1.
Figure 4:
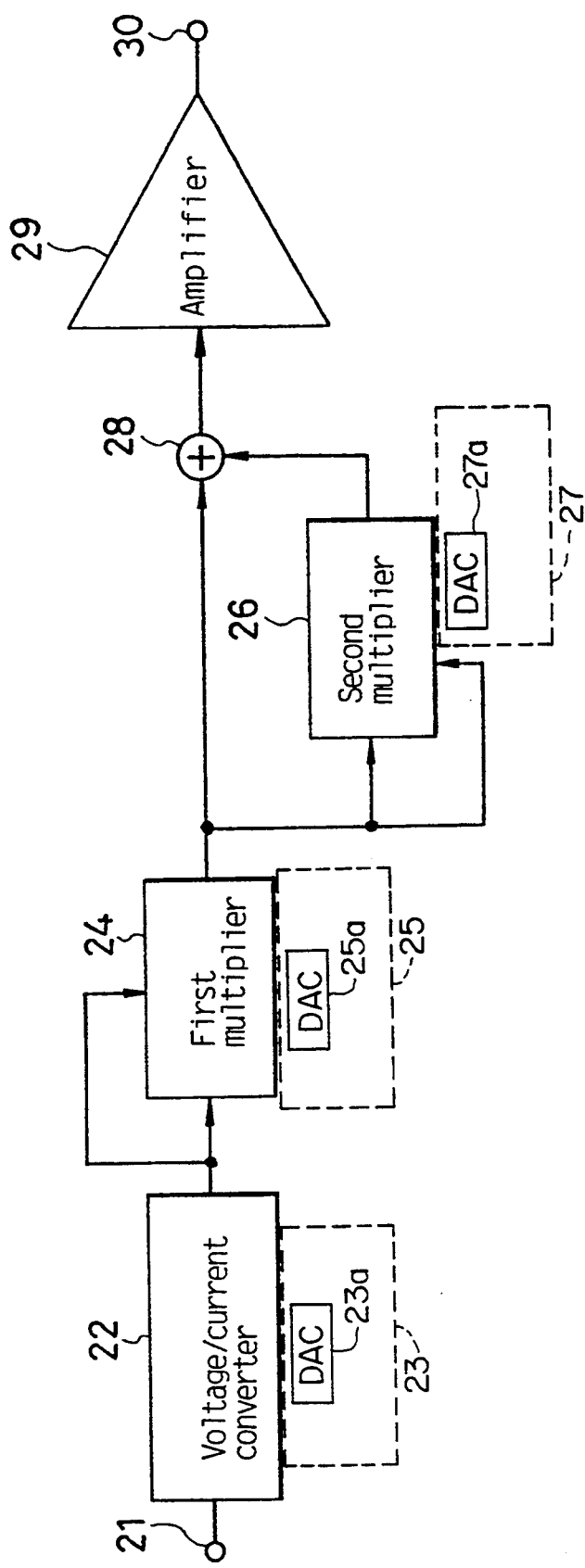
FIG. 4 is a block diagram of the prior art pincushion correction circuit.
Figure 5:
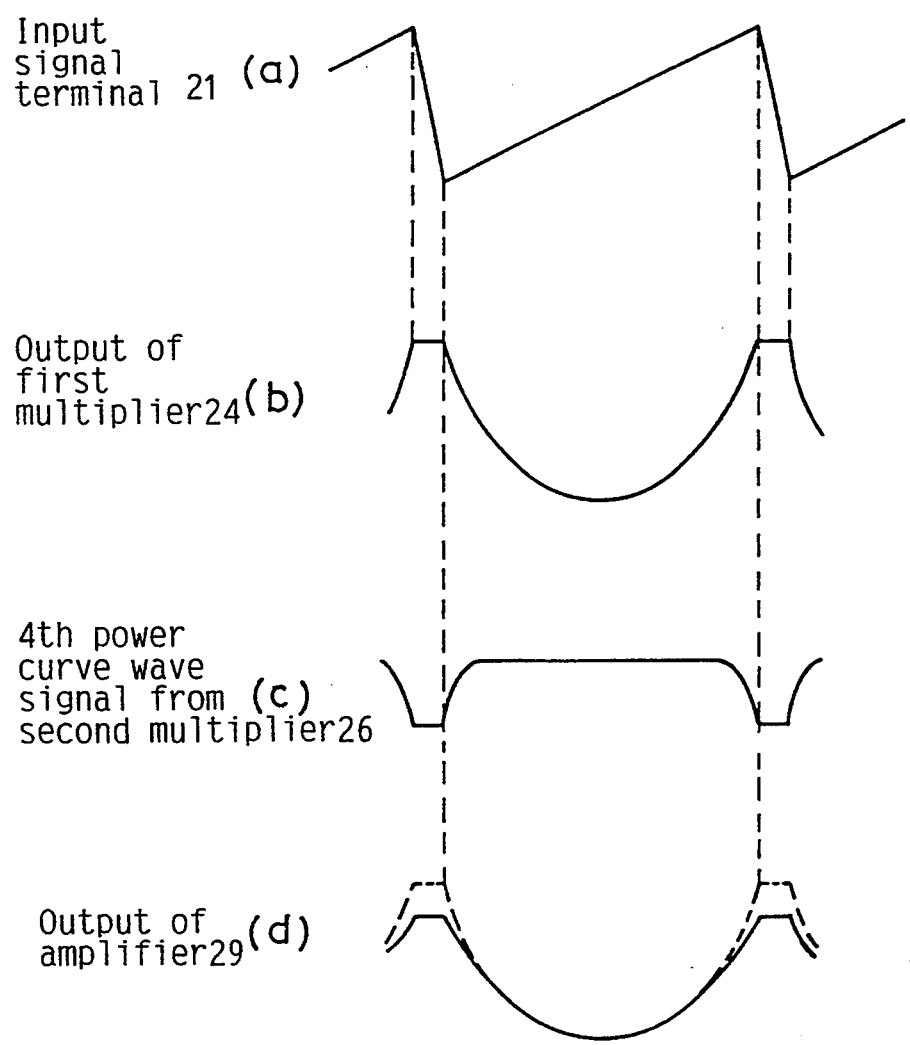
FIG. 5(a) through 5(b) are a set of waveform charts showing the generation of corner distortion correction signals in the prior art pincushion correction circuit.

In the following paragraphs, the operation of the embodiment thus configured as shown in FIG. 1 will be described by referring to FIG. 3.

When a vertical sawtooth signal 1 having a waveform shown in FIG. 3(a) and the cycle of a vertical scanning frequency is input to the circuitry as shown in FIG. 1, the upper parts of the vertical sawtooth signal corresponding to the bottom corners of the raster on display is sampled by the first differential comparator 2 and issues therefrom as shown in FIG. 3(b). The sampled signal is then multiplied by itself (i.e. squared) in the first multiplier circuit 4, whereby a sharp-peaked signal as shown in FIG. 3(c) is produced. The amplitude of the sharp-peaked signal is adjusted by the first amplitude adjusting circuit 6 and is then supplied through the adder circuit 10 to the amplifier circuit 15.

Similarly, the lower parts of the vertical sawtooth signal corresponding to the top corners of the raster on display is sampled by the second differential comparator 3 and issues therefrom as shown in FIG. 3(d). The sampled signal is then multiplied by itself (i.e. squared) in the second multiplier circuit 5, whereby a sharp-peaked signal as shown in FIG. 3(e) is produced. The amplitude of the sharp-peaked signal is adjusted by the second amplitude adjusting circuit 8 and is then supplied through the adder circuit 10 to the amplifier circuit 15. As a result, both end parts, corresponding to the top and the bottom parts of raster, of the parabolic wave signal produced by the third multiplier 13 is raised up; and hence a correction signal having a waveform shown by the dotted line in FIG. 3(f) is obtained at the output end 16 of the amplifier circuit 15.

Hithertofore in the prior art, the quadratic curve (parabolic) wave signal obtained by squaring the pincushion-distortion-correction parabolic-wave signal has been employed as a corner distortion correction wave signal. By such conventional means, however, when the correction in the top corners of the raster display and the bottom corners of the raster display have asymmetrical distortion, independent distortion correction cannot be made between the top corners and the bottom corners.

In the present invention, by providing the circuits encircled by the broken line in FIG. 1 and by processing the signal in the above-mentioned manner, it is possible to perform a correction in the top corners independent from that in the bottom corners. Thus, a better and easier pincushion correction adjustment can be made.

For this purpose, the distribution ratio in the signal to be output from the voltage/current converter 11, and the amplitudes of the sharp-peaked signals supplied by the first and second multiplier circuits 4 and 5 are individually adjusted by control signals to input terminals 7 and 9, respectively, with the resultant signal having the intended waveform.

Figure 2A:
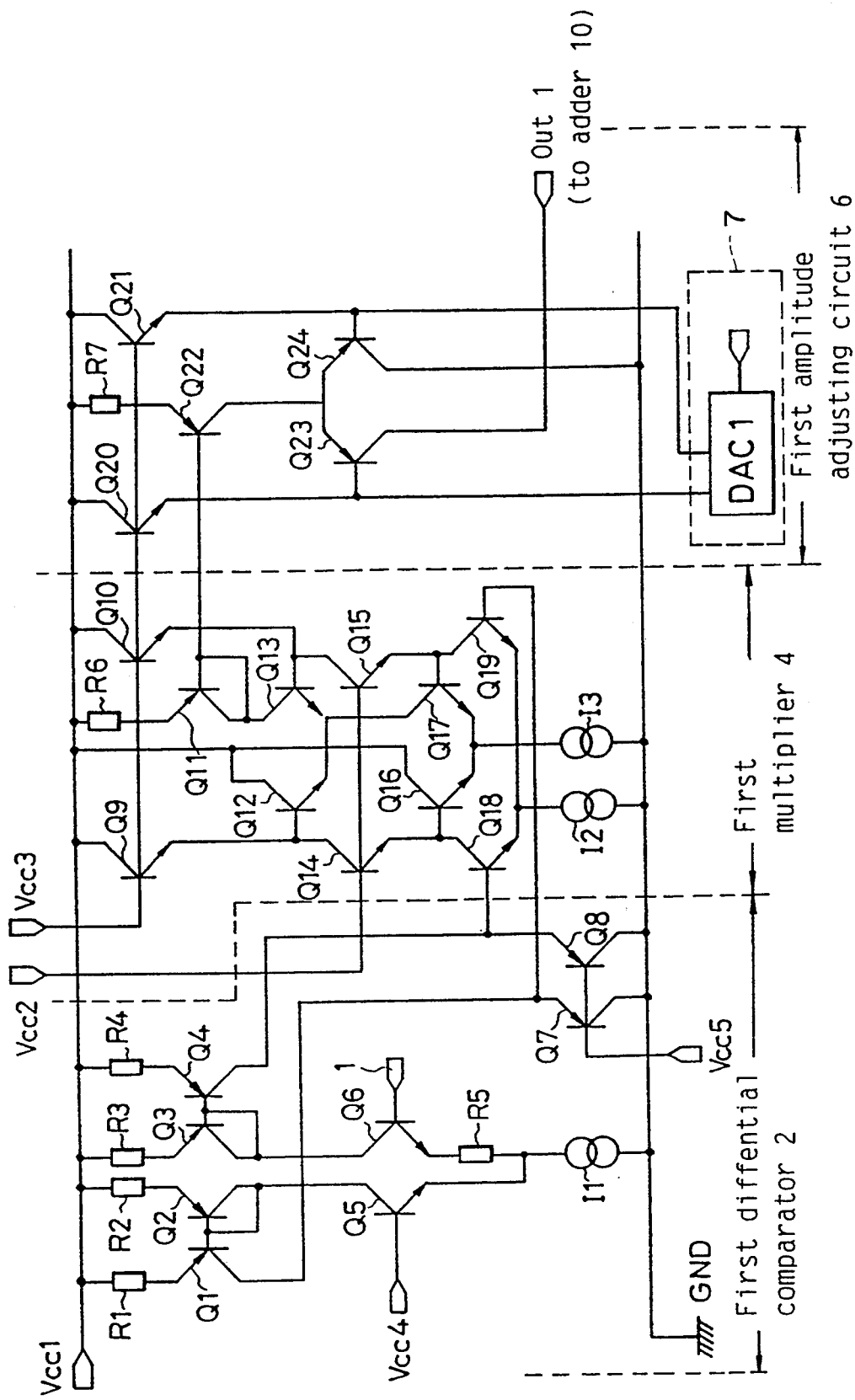
Figure 2B:
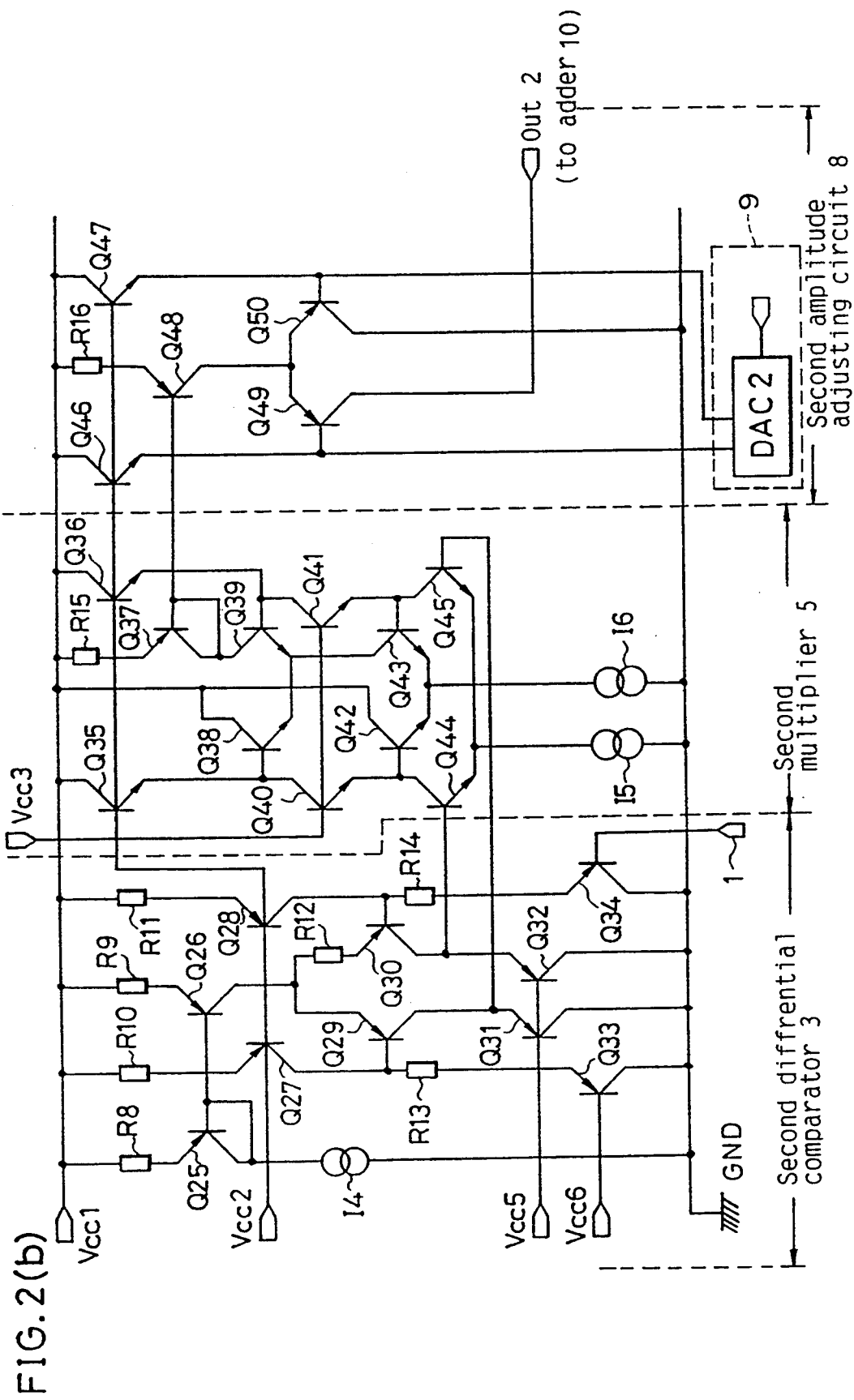

FIGS. 2(a) and 2(b) show examples of circuit diagrams corresponding to the upper half portion of circuitry (2+4+6) and the lower half portion of circuitry (3+5+8) of the embodiment the broken-line encircled block 20 of FIG. 1.

FIG. 2(a) shows a circuit for generating the bottom-corner-distortion correcting wave, wherein a vertical sawtooth wave signal or a constant amplitude is applied to the input terminal 1 connected to the base of the transistor Q6. The portion of the applied sawtooth wave signal which is higher than a reference voltage Vcc 4 applied to base of the transistor Q5 is sampled by the first differential comparator 2. The sampled signal is multiplied by itself (i.e. squared) in the first multiplier 4 consisting essentially of transistors Q12, Q13, Q14, Q15, Q16, Q17, Q18 and Q19. The amplitude of the squared output signal is then adjusted in the first amplitude adjusting circuit 6, which is a differential circuit essentially comprised of transistors Q23 and Q24, by varying the control current supplied from DAC1. The waveform of the adjusted signal is shown in FIG. 3(c).

FIG. 2(b) shows a circuit for generating the top-corner-distortion correcting wave, wherein a vertical sawtooth wave signal of a constant amplitude is applied to the input terminal 1 connected to the base of transistor Q34. The portion of the applied sawtooth wave signal which is lower than a reference voltage Vcc 6 applied to the base of transistor Q33 is sampled by the second differential comparator 3. The sampled signal is multiplied by itself (i.e. squared) in the second multiplier 5 consisting essentially of transistors Q38, Q39, Q40, Q41, Q42, Q43, Q44 and Q45. The amplitude of the squared output signal is then adjusted in the second amplitude adjusting circuit 8, which is a differential circuit essentially comprised of transistors Q49 and Q50, by varying the control current supplied from DAC2. The waveform of the adjusted signal is shown in FIG. 3(e).

Although the present invention has been described in its preferred form with a certain degree of particularity, it is understood that the present disclosure of preferred form can be changed in the details of construction and the combination and arrangement of parts and components without going out from the spirit and the scope of the invention as hereinafter claimed.

What is claimed is:

1. A corner pincushion correction apparatus for correcting a pincusion distortion in top corners and bottom corners of a raster display comprising:
   a pair of unit circuits including a first unit and a second unit:
   said first unit comprising:
      a first differential comparator circuit which is supplied with a saw-tooth wave voltage signal having a vertical scanning frequency for sampling an upper portion of said sawtooth wave signal which corresponds to the bottom corners of the raster display;
      a first multiplier which multiplies an output signal of said first differential comparator circuit by itself to make a square thereof;
      a first amplitude adjusting circuit which adjusts an amplitude of an output signal of said first multiplier, in accordance with a first control data signal applied to said first amplitude adjusting circuit;
   said second unit comprising:
      a second differential comparator circuit which is supplied with a saw-tooth wave voltage signal having said vertical scanning frequency for sampling a lower portion of said sawtooth wave signal which corresponds to the top corners of the raster display;
      a second multiplier which multiplies an output signal of said second differential comparator circuit by itself to make a square thereof;
      a second amplitude adjusting circuit which adjusts an amplitude of an output signal of said second multiplier, in accordance with a second control data signal applied to said second amplitude adjusting circuit;
   an adder circuit which performs an addition of said amplitude-adjusted output signals of said first amplitude adjusting circuit and said second amplitude adjusting circuit, to thereby produce a sum signal thereof;
   a voltage/current converter which is supplied with said sawtooth wave voltage signal for converting said sawtooth wave voltage signal into a current signal, in accordance with a control data signal;
   a third multiplier circuit which receives said voltage/current converted current signal of said voltage/current converter and squares said current signal to produce an east/west-pincushion distortion-correction quadratic curve (parabolic) signal in accordance with a control data signal given thereto; and
   an amplifier circuit which receives said east/west-pincushion distortion-correction quadratic curve (parabolic) signal produced by said third multiplier circuit and said corner distortion correction signal supplied by said adder circuit.

2. A cathode ray tube display device for a television receiver or a video monitor for a computer output which comprises; said corner pincushion correction circuit as claimed in claim 1.

3. A pincushion correction apparatus for separately correcting a pincushion distortion in top corners and a pincushion distortion in bottom corners of a raster display comprising:
   a first and a second distortion correction circuit;
   said first distortion correction circuit comprising:
      i.) a first differential comparator circuit having an input for a saw-tooth wave voltage signal having a vertical scanning frequency for sampling a first portion of said saw-tooth voltage input signal which corresponds to a first and second bottom corner of said raster display;
      ii.) a first multiplier for multiplying an output of said first differential comparator circuit by itself to make a squared signal thereof; and
      iii.) a first amplitude adjusting circuit for adjusting an amplitude of an output signal of said first multiplier in accordance with an input of a first control data signal applied to said first amplitude adjusting circuit;
   said second distortion correction circuit comprising:
      i.) a second differential comparator circuit having an input for a saw-tooth wave voltage signal having a vertical scanning frequency for sampling a second portion of said saw-tooth voltage input signal which corresponds to a first and a second top corner of said raster display;
      ii.) a second multiplier for multiplying an output of said second differential comparator circuit by itself to make a squared signal thereof; and
      iii.) a second amplitude adjusting circuit for adjusting an amplitude of an output signal of said second multiplier in accordance with an input of a second control data signal applied to said second amplitude adjusting circuit;
   an adder circuit for adding said amplitude-adjusted output signals of said first and second amplitude adjusting circuits wherein a sum signal is produced;
   a voltage/current converter for converting said sawtooth voltage input signal into a current signal, said voltage/current converter having an output of said current signal in accordance with a third control data signal input to said voltage/current converter;
   a third multiplier circuit for multiplying said output of said voltage/current converter by itself to make a squared signal thereof, said third multiplier circuit producing an east/west pincushion distortion correction quadratic curve signal in accordance with a fourth control data signal input to said third multiplier circuit; and
   an amplifier circuit for receiving said east/west pincushion distortion correction quadratic curve signal from said third multiplier circuit and said sum signal from said adder circuit.

4. A pincushion correction apparatus for separately correcting a pincushion distortion in top corners and a pincushion distortion in bottom corners of a raster display according to claim 3, wherein said apparatus controls a pincushion distortion of a cathode ray tube display device.

5. A pincushion correction apparatus for separately correcting a pincushion distortion in top corners and a pincushion distortion in bottom corners of a raster display comprising:
- a first and a second distortion correction circuit;
- said first distortion correction circuit comprising:
  - i.) a first differential comparator means for sampling a first portion of an voltage input signal which corresponds to a first and second bottom corner of said raster display;
  - ii.) a first multiplier means for multiplying an output of said first differential comparator means by itself to make a squared signal thereof; and
  - iii.) a first amplitude adjusting means for adjusting an amplitude of an output signal of said first multiplier means in accordance with an input of a first control data signal applied to said first amplitude adjusting means;
- said second distortion correction circuit comprising:
  - i.) a second differential comparator means for sampling a second portion of said voltage input signal which corresponds to a first and a second top corner of said raster display;
  - ii.) a second multiplier means for multiplying an output of said second differential comparator means by itself to make a squared signal thereof; and
  - iii.) a second amplitude adjusting means for adjusting an amplitude of an output signal of said second multiplier means in accordance with an input of a second control data signal applied to said second amplitude adjusting means;
- an adder means for adding said amplitude-adjusted output signals of said first and second amplitude adjusting means wherein a sum signal is produced;
- a voltage/current converter means for converting said voltage input signal into a current signal, said voltage/current converter means having an output of said current signal in accordance with a third control data signal input to said voltage/current converter means;
- a third multiplier means for multiplying said output of said voltage/current converter means by itself to make a squared signal thereof, said third multiplier means producing an east/west pincushion distortion correction quadratic curve signal in accordance with a fourth control data signal input to said third multiplier means; and
- an amplifier means for receiving said east/west pincushion distortion correction quadratic curve signal from said third multiplier means and said sum signal from said adder means.

6. A pincushion correction apparatus for separately correcting a pincushion distortion in top corners and a pincushion distortion in bottom corners of a raster display according to claim 5, wherein said apparatus controls a pincushion distortion in a cathode ray tube display device.

* * * * *